United States Patent
Vimal et al.

(10) Patent No.: US 9,321,028 B2
(45) Date of Patent: Apr. 26, 2016

(54) PROCESS FLOW SHEET FOR PRE-TREATMENT OF HIGH ASH COAL TO PRODUCE CLEAN COAL

(75) Inventors: Kumar Chandaliya Vimal, Jamshedpur (IN); P. K Banerjee, Jamshedpur (IN); D. K Sharma, New Delhi (IN)

(73) Assignee: Tata Steel Limited, Jamshedpur (IN)

( * ) Notice: Subject to any disclaimer, the term of this patent is extended or adjusted under 35 U.S.C. 154(b) by 100 days.

(21) Appl. No.: 14/344,210

(22) PCT Filed: Sep. 4, 2012

(86) PCT No.: PCT/IN2012/000577
§ 371 (c)(1),
(2), (4) Date: Mar. 11, 2014

(87) PCT Pub. No.: WO2013/136342
PCT Pub. Date: Sep. 19, 2013

(65) Prior Publication Data
US 2014/0366432 A1    Dec. 18, 2014

(30) Foreign Application Priority Data
Mar. 14, 2012 (IN) .............................. 284/KOL/2012

(51) Int. Cl.
*C10L 5/00* (2006.01)
*C10L 10/06* (2006.01)
(Continued)

(52) U.S. Cl.
CPC ............... *B01J 19/126* (2013.01); *B01J 19/10* (2013.01); *C10L 5/26* (2013.01); *C10L 9/02* (2013.01); *C10L 9/08* (2013.01); *B01J 2219/0879* (2013.01); *B01J 2219/1206* (2013.01)

(58) Field of Classification Search
CPC ..................... B01J 19/126; B01J 2219/00141; B01J 2219/1206; B01J 2219/129; B01J 2219/1296; B01J 19/10; C10G 1/00

USPC .......... 422/186.29; 204/157.43; 588/304, 310; 208/400, 402, 211, 311, 312
See application file for complete search history.

(56) References Cited

U.S. PATENT DOCUMENTS

| 4,272,356 A | 6/1981 | Stiller et al. |
| 7,081,196 B2 * | 7/2006 | Cullen ........................ 208/211 |

(Continued)

FOREIGN PATENT DOCUMENTS

| IN | 1292KOL2006 | 4/2007 |
| IN | 200600924 I2 * | 4/2008 |

(Continued)

OTHER PUBLICATIONS

Ethylenediamine Assisted Solvent Extraction of Coal in N Methyl 2 Pyrrolidone Synergistic Effect by Shailaja Pande and D.K. Sharma Energy & Fuels (2002), 16, 194-204.*

(Continued)

*Primary Examiner* — Pamela H Weiss
(74) *Attorney, Agent, or Firm* — The Webb Law Firm

(57) ABSTRACT

A process for treating coal to obtain lower ash content coal including: (i) pretreating high ash coal in a pretreatment unit with ultrasonic waves or microwaves, (ii) forming a slurry of coal fines in a solvent solution including N-Methyl-2-pyrrolidone (NMP) and one of Ethylenediamine (EDA) or Monoethanolamine (MEA), (iii) maintaining said slurry in a refluxed condition at a temperature of about 170-190° C. for a period of about 15 minutes to 2 hours; (iv) separating the refluxed slurry into two parts consisting of extract and residue by coarse filtration, (v) recovering up to 85% of the solvent solution by evaporation of the extract to form a concentrated extract, (v) precipitating the coal by adding water to the concentrated extract, (vi) separating the coal from the water-extract solution by filtration, and (vii) recovering the rest of the solvent by distillation of the water-extract solution.

11 Claims, 1 Drawing Sheet

(51) Int. Cl.
  *A62D 3/13* (2007.01)
  *B01J 19/12* (2006.01)
  *C10L 9/02* (2006.01)
  *C10L 9/08* (2006.01)
  *B01J 19/10* (2006.01)
  *C10L 5/26* (2006.01)

(56) References Cited

U.S. PATENT DOCUMENTS

| 8,262,751 | B2 * | 9/2012 | Biswas et al. ............ 44/627 |
| 2005/0236403 | A1 | 10/2005 | Kingman |
| 2010/0307054 | A1 * | 12/2010 | Biswas et al. ............ 44/621 |
| 2011/0179702 | A1 * | 7/2011 | Biswas et al. ............ 44/621 |

FOREIGN PATENT DOCUMENTS

| IN | 200600924 I2 * | 11/2008 |
| IN | 1088KOL2007 | 4/2009 |
| IN | 1336KOL2008 | 2/2010 |
| IN | 200801336 I2 * | 2/2010 |
| IN | 200900950 I2 * | 1/2011 |
| JP | 200126791 A | 1/2001 |
| JP | 201023018 A | 2/2010 |
| WO | 2010029563 A1 | 3/2010 |
| WO | 2010052735 A1 | 5/2010 |

OTHER PUBLICATIONS

Improvement of Grinding Characteristics of Indian Coal by Microwave PreTreatment, Fuel Process Technology 92 (Jun. 8, 2011) 1920-1928).*

Mirza et al., "Extraction of Coals Through Dilute Alkaline Hydrolytic Treatment at Low Temperature and Ambient Pressure", Fuel Processing Technology, 1984, 149-162, vol. 9.

* cited by examiner

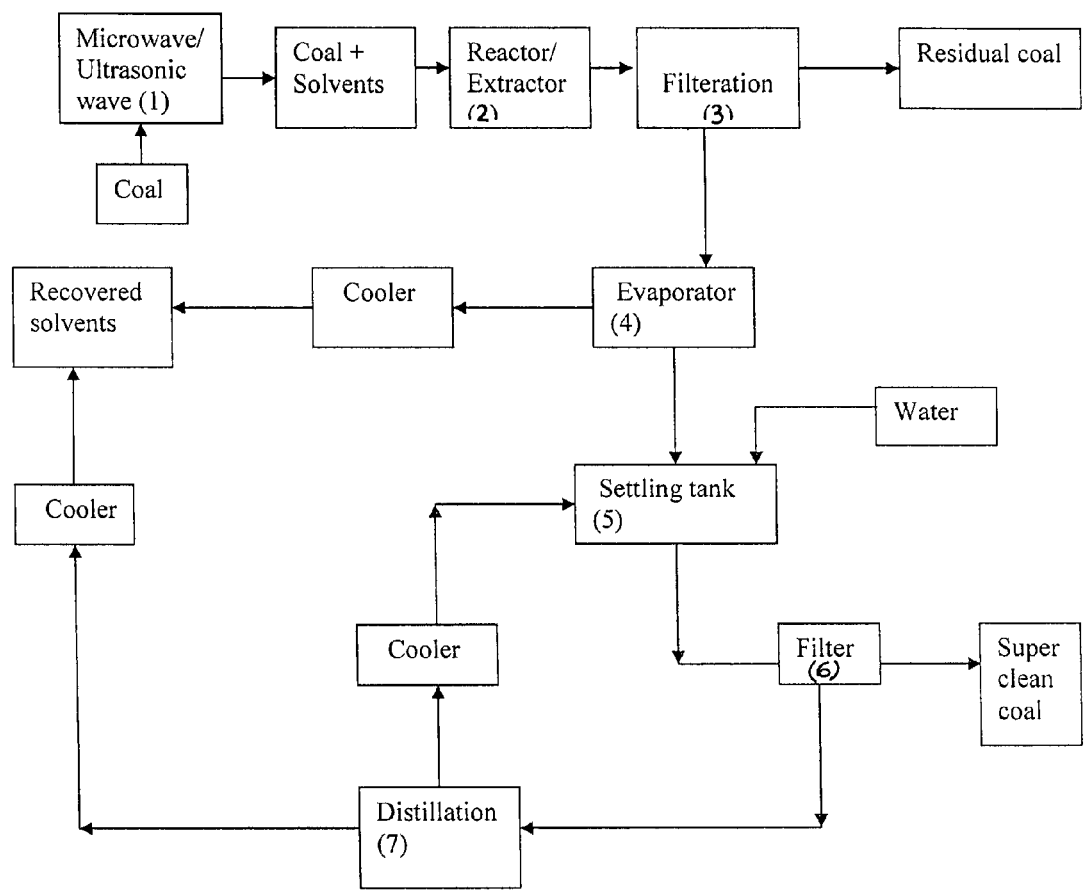

PROCESS FLOW SHEET FOR PRE-TREATMENT OF HIGH ASH COAL TO PRODUCE CLEAN COAL

CROSS-REFERENCE TO RELATED APPLICATIONS

This application is the United States national phase of International Application No. PCT/IN2012/000577 filed Sep. 4, 2012, and claims priority to Indian Patent Application No. 284/KOL/2012 filed Mar. 14, 2012, the disclosures of which are hereby incorporated in their entirety by reference.

FIELD OF THE INVENTION

The present invention relates to a process to produce low ash clean coal from high ash coal for various metallurgical applications by pretreatment of high ash coal with microwave and ultra sonic treatment followed by solvent extraction.

BACKGROUND OF THE INVENTION

The concept and practice of chemical beneficiation process comes from the limitation of physical beneficiation processes. Broadly, a chemical beneficiation process is possible by chemical leaching of mineral matter present in coal or, dissolving organic matter of coal in various organic solvents. As coal is heterogeneous mixture of organic and inorganic constituents, solvolysis of coal varies with its composition, maturity, and structural characteristics. Since the mineral matter (non-combustible) available in specific geographical locations is very finely disseminated in the organic mass, it is really very difficult to remove the non-combustible mineral matter by conventional physical coal washing techniques. Presence of high percentage of near gravity material in such type of coal makes the scope of implementing a gravity separation process limited. This indicates that chemical treatment may be the right approach to overcome the limitation of physical beneficiation methods. A plurality of technical literature is available on chemical beneficiation techniques that employ highly corrosive chemicals (mostly acids and alkalis). Recovery or regeneration of these chemicals is very important to make this technology viable. A parallel approach towards lowering ash could be through recovering the premium organic matter from coal by solvent refining. Literature reveals that most of the research work on this subject was carried out with an objective to produce ultra clean coal or super clear coal with ash content less than 0.2% for high-tech end uses. This conventional solvent refining process does not serve the objective of low ash coal requirement of steel industries mainly, because of low recovery which makes the process uneconomic especially when such an ultraclean coal is not absolutely desired, and the cost of the process is too high as entailed by low yields.

The main advantages of the prior art process are i) ease of recovery of solvent in the main process steam, ii) solvolytic efficiency of recovered solvents as that of fresh solvent, iii) 95-98% recovery of the solvent, iv) improved coking properties of clean coal, and v) availability of industrial organic solvents.

According to the existing process, coal, solvent (N-Methyl-2-Pyrrolidone, NMP) and co-solvent (Ethylenediamine, EDA or Monoethanolamine, MEA) are mixed thoroughly to produce coal slurry. The coal slurry is extracted in a known manner which includes coal-solvent mixture. The mixture is separated in a separation unit to produce a coarser fraction and a finer fraction. The finer fraction is fed to an evaporator unit to allow 70 to 80% of solvent recovery. The hot concentrated coal-solvent mixture is then flushed in a precipitation tank to precipitate the coal, where, water as an anti-solvent is being used. Water separates the solvent from coal and we get water-solvent mixture, which is fed to distillation unit to separate solvent and anti-solvent. And precipitated coal is separated in a filtration unit.

In the existing processes pretreatment of coal is not being done. It is a solvent extraction of coal process without any pretreatment of coal. So there is a scope of pretreatment of coal by microwave and ultrasonication, (1) to open up the pores of coal samples, facilitation and (2) disrupt the coal (organic matter) and mineral matter physical (or chemical) association, for enhancement of clean coal extraction. Our aim is to have comparative study of solvent extraction with pretreatment followed by solvent extraction. Also, to study room temperature dissolution as another attempt to reduce the heat consumption.

JP2001026791 discloses a method for producing an ashless coal is to bring a raw material coal in contact with N-methyl-2-pyrrolidinone solvent or a mixed solvent of carbon disulfide with N-methyl-2-pyrrolidinone in the presence of a chlorine or fluorine compound for extracting the ash-less coal.

JP2010023018 describes a pretreatment method and device. Accordingly, scavenger, a bubbling agent, and air are fed into the slurried coal ash composed of the unburned carbon-containing coal ash and water so as to produce bubbles, and the unburned carbon is caught in the bubbles. Before the slurried coal ash is fed to a floatation apparatus for separating tail ash having a low unburned carbon content, ultrasonic waves are emitted thereto by an ultrasonic wave generating apparatus so that the separation efficiency of the unburned carbon from the coal ash is increased.

WO2010029563 teaches an improved organo-refining process to produce low ash clean coal from high ash coal, the method comprising the steps of: mixing of coal, solvent and a co-solvent; feeding the slurry to a reactor by pumping; the reactor maintaining a temperature about 200 deg. C to 300 deg. C and a pressure of 1.5 atm.; extracting coal-solvent mixture; feeding the extracted coal to a flasher unit; recovering about 30% of the solvent from the flashing unit; feeding the remaining heavy material with some coal extracts to an evaporator; extracting about 60% of solvent from the evaporator; discharging the residue from the evaporator to a precipitator; filtering the slurry in a rotary drum; collecting the super clean coal as residue containing 0.1 to 10% ash; feeding the filtrate into a distillation unit; separating water and organic material in order to recover at least 7 to 8% of the remaining solvent.

US2005236403 discloses pre-treatment of multi-phase materials. The material having a first phase of material and a second phase of material. The method comprises heating the material electromagnetically, preferably with microwaves, to produce a power density of at least $10^{<9>}Wm^{<-3>}$ in a continuous process in which the material moves into and through an electromagnetic, preferably microwave, treatment area. The material experiences exposure to microwaves, in the treatment area for a time of the order of ½ second or less before the material is passed out of the treatment area for subsequent operation.

However, the present inventors in course of developing the disclosed invention have identified that recovery of clean coal and its ash content depend on various operating parameters and feed characteristics for example, faster and convenient filtration of refluxed solution at different size, selection of solvent and co-solvent, coal and source (feed characteristics), particle size, coal-solvent ratio, extraction time, and extraction temperature.

By way of reference, prior Indian patent application numbers 1336/KOL/2008, 1088/KOL/07 and 1292/KOL/06 are incorporated herein.

OBJECTS OF THE INVENTION

It is therefore an object of this invention to propose a process to produce low ash clean coal from high ash coal.

Another object of the invention is to propose a process to produce low ash clean coal from high ash coal, in which coal is being treated by solvent extraction method.

Another object of the invention is to propose a process to produce low ash clean coal from high ash coal, in which coal is being treated with microwave before solvent extraction process.

A still another object of the invention is to propose a process to produce low ash clean coal from high ash coal, which exhibits high recovery of solvent.

Yet another object of the invention is to propose a process to produce low ash clean coal from high ash coal, in which coal is being treated with ultra sonic waves before solvent extraction process.

A further object of the invention is to propose a process to produce low ash clean coal from high ash coal, in which coal pores are being opened before solvent extraction process.

A further object of the invention is to propose a process to produce low ash clean coal from high ash coal, in which solvent and co-solvent are being used for extraction process.

A further object of the is to propose a process to produce low ash clean coal from high ash coal, which reduces consumption of heat energy by using co-solvent which allows reflux of coal-solvent-co-solvent mixture at lower temperatures than those required when solvent is used alone.

A further object of the invention is to propose a process to produce low ash clean coal from high ash coal, which reduces consumption of heat energy by allowing dissolution at room temperature.

SUMMARY OF THE INVENTION

According to the inventive process; coal, solvent and co-solvent are provided in a pre defined ratio. Coal to solvent ratio is varied from 1:6 to 1:20 (wt/vol, g/ml), coal to solvent are wt/vol and solvent to co-solvent ratios are vol/vol wherever mentioned). Coal to co-solvent ratio is varied from 1:1 to 1:5 (g/ml), while co-solvent to solvent ratio is varied from 1:1 to 1:20. The boiling point of EDA, MEA, NMP and water is 117° C., 170° C., 202° C. and 100° C. respectively. According to the innovative process, coal is pretreated in ultrasonication equipment for 2 minutes to 10 minutes and then solvent extraction at room temperature and at reflux condition is being done. In other innovative process, coal is being pretreated in microwave oven for 30 seconds to 2 minutes and then solvent extraction at reflux condition is carried out. In other innovative process, coal is treated with solvent (NMP) and co-solvent (EDA or MEA) for 15 minutes to 2 hours only by solvent extraction process no pretreatment is being done. In other innovative process, coal is dissolute at room temperature with NMP and EDA.

BRIEF DESCRIPTION OF THE ACCOMPANYING DRAWINGS

FIG. 1 Shows a process flow sheet for pre-treatment of high ash coal to produce clean coal according to the invention.

DETAILED DESCRIPTION OF THE INVENTION

According to the invention, high ash coal is treated by solvent extraction process at reflux conditions for 15 minutes to 2 hours to produce the clean coal. Frequently, solvent cannot penetrate into the pores of coal. It is known the pores of the coal are opened with pretreatment to increase the clean coal yield in solvent extraction process. So, the coal is pretreated in ultrasonication equipment as well as in microwave oven to open up the pores of the coal before solvent extraction process. Such pre-treatment tend to disrupt the associative forces between the organic matter of coal and its inorganic mineral matter. Coal sample along with solvent is treated in ultrasonication equipment for 2 to 10 minutes, while being treated for 30 seconds to 2 minutes in microwave oven. This slurry (coal solvent slurry) is maintained for room temperature extraction or transfer to an extraction apparatus, where extraction takes place for 15 minutes to 2 hours. Then the refluxed mixture is filtered using 500 stainless steel BSS mesh (0.025 mm) cloth. These steps allow coarser and faster filtration at 0.025 mm size in comparison to that obtained by using the known Whatman filter paper. Therefore, an increase in yield of clean coal and simultaneously increase in ash content of the clean coal, can be clearly achieved. Accordingly, the inventive process is found to be advantageous to produce high yield clean coal with low ash content (5-10%) through a faster filtration process.

Feed coal ash was in the range of 25-35%. The ratio of NMP and MEA, NMP and EDA may vary from 1:1 to 20:1 and the coal (g) to solvents (ml) ratio may vary from 1:06 to 1:20. Comparison of the extraction yields when coal to co-solvent ratio is 1:1 obtained without ultrasonication (45%) with that obtained by ultrasonication followed by solvent extraction (47%), showed an improvement in the yield. Clean coal ash was in the range of 8-10%. In case of co-solvent to solvent ratio 1:1, extraction yield obtained without ultrasonication (35%) while ultrasonication followed by solvent extraction (37%). Clean coal ash was in the range of 10-12%. Again, it showed improved results with ultrasonication. Extraction yield is about 45% without microwave treatment, while it is about 47% with microwave followed by solvent extraction. The clean coal ash is in the range of 8-10%. Feed coal sample having ash around 13%, extraction yield was about 66% without microwave treatment, while it was about 68% when pretreated in microwave oven followed by solvent extraction. Pretreatment of coal with ultrasonication or with microwave helps in clean coal yield improvement. This invention thus enables producing low ash (<12%) clean coal for coke making purpose with very high yield through a relatively faster filtration. The extraction yields on dry mineral matter basis will be still higher.

Results obtained without pretreatment of coal is as follows. Feed coal ash was in the range of 25-35%. The ratio of NMP and MEA, NMP and EDA may vary from 1:1 to 20:1 and the coal (g) to solvents (ml) ratio may vary from 1:06 to 1:20. When coal was treated with NMP and EDA, clean coal yield was about 45% having 8% ash. When coal was treated with NMP and MEA, clean coal yield was in the range of 45-50% and clean coal ash was in the range of 5-8%. Both co-solvents give us similar results. This shows that we can use EDA as well as MEA as a co-solvent in the solvent extraction of coal process.

A process has been developed for bench scale operation which is shown in FIG. 1. The process consists of seven units namely, (i) an ultrasonication or microwave oven (1), (ii) an Extractor (2), (iii) a first filteration (3) separation size 500 mesh), (iv) an Evaproator column (4), (v) a Precipitation tank (5), (vi) a second filteration (6) (for complete solid-liquid separation) and (vii) a Distillation column (7).

Coal is pretreated in ultrasonication or microwave units before extraction. Residence time in these units may vary from 30 seconds to 10 minutes. Coal, solvent and co-solvent are mixed thoroughly in coal-solvent feed tank. If pretreatment is not being done then coal solvent slurry would be fed direct from feed tank to reactor/extractor. Coal slurry is then pumped into the extractor (2). A temperature around 170-190° C. is achieved in the extractor (1) slowly. This is about 12-32° C. lower than that of the reflux temperature for the NMP when used without co-solvent. Therefore, the use of co-solvents affords the conservation of energy and thus saving in heat energy required during refluxing. Residence time in the extractor (2) may vary from 15 minutes to 2 h and i.e. dictated by the techno economics of the process and its specific requirement. Extracted coal-solvent mixture is then separated through a first filter (3) or any separation unit which may cut the mixture in two fractions: coarser fraction (+0.025 mm) and finer fraction (−0.025 mm). Coarser fraction contains high ash and is called as residue. The finer fraction or filtered extract is then fed to an evaporator unit (4). Maximum 80-85% solvent recovery may be allowed through evaporator unit (4). The concentrated coal-solvent mixture is flushed in a precipitation tank (5). As NMP-EDA or NMP-MEA solvents are soluble in water, extracted coal gets separated from the solution phase and gets precipitated. This precipitated coal is separated through a second filter (6). Thus obtained clean coal contains less than 8% ash. The filtrate consists of solvent-water solution and solvent is recovered through a second distillation unit (7). The secondary product of the distillation unit (7) is hot water, which may be used as a washing media in a precipitation tank (5). It is possible to recover around 98-99% of solvent through the evaporator and distillation units (4,7).

We claim:

1. A process for treating coal to obtain lower ash content coal comprising: (i) forming a slurry of high ash coal fines in a solvent solution comprising N-Methyl-2-pyrrolidone (NMP) and one of Ethylenediamine (EDA) or Monoethanolamine (MEA), (ii) pretreating the high ash coal slurry in a pretreatment unit with ultrasonic waves or with microwaves, wherein a NMP to EDA or a NMP to MEA ratio is 1:1 to 20:1, said slurry containing about 10 to 25 ml of solution per g of coal, (iii) maintaining said slurry in a refluxed condition at room temperature for a period of about 15 minutes to 2 hours, (iv) separating the refluxed slurry in two parts consisting of extract and residue by coarse filtration with a 0.025 mm filter cloth, (v) recovering up to 85% of the solvent solution by evaporation of the extract to form a concentrated extract, (vi) precipitating the coal by adding an anti-solvent or water to the concentrated extract to form an anti-solvent-concentrated extract solution or a water-concentrated extract solution, (vii) separating the coal from the anti-solvent-concentrated extract solution or the water-concentrated extract solution by filtration, said coal having a reduced ash content and (viii) recovering the rest of the solvent by distillation of the anti-solvent-concentrated extract solution or the water-concentrated extract solution.

2. The process as claimed in claim 1, wherein said high ash coal comprises run of mine coal.

3. The process as claimed in claim 1, wherein said high ash coal comprises medium coking coal.

4. The process as claimed in claim 1, wherein said high ash coal comprises clean coal after physical beneficiation.

5. The process as claimed in claim 2, wherein said high ash coal particle size is −2 mm to 0.5 mm.

6. The process as claimed in claim 1, wherein the coal having a reduced ash content separated in step (vii) is ultra low ash clean coal or super clean coal having an ash content of <1% and is separated using fine filtration of the refluxed solution.

7. The process as claimed in claim 6, wherein said ultra low ash clean coal or super clean coal has an ash content of <0.2%.

8. The process as claimed in claim 1, wherein the coal having a reduced ash content separated in step (vii) is moderate ash clean coal having an ash content of <12% and is separated using coarse filtration of the refluxed solution.

9. The process as claimed in claim 8, wherein said moderate ash clean coal has an ash content of <8%.

10. The process as claimed in claim 1, wherein 99% recovery of the solvent is achieved.

11. The process as claimed in claim 2, wherein said coal particle size is 0 to 0.25 mm.

\* \* \* \* \*